(12) United States Patent
Liu

(10) Patent No.: US 10,911,581 B2
(45) Date of Patent: Feb. 2, 2021

(54) PACKET PARSING METHOD AND DEVICE

(71) Applicant: Huawei Technologies Co., Ltd., Shenzhen (CN)

(72) Inventor: Shucheng Liu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/173,651

(22) Filed: Oct. 29, 2018

(65) Prior Publication Data
US 2019/0068762 A1    Feb. 28, 2019

Related U.S. Application Data

(63) Continuation of application No. PCT/CN2017/080094, filed on Apr. 11, 2017.

(30) Foreign Application Priority Data

Apr. 28, 2016  (CN) .......................... 2016 1 0278999

(51) Int. Cl.
| H04L 29/06 | (2006.01) |
| H04L 9/06 | (2006.01) |
| H04L 9/08 | (2006.01) |

(52) U.S. Cl.
CPC ............ *H04L 69/22* (2013.01); *H04L 9/0618* (2013.01); *H04L 9/0825* (2013.01); *H04L 29/06* (2013.01);
(Continued)

(58) Field of Classification Search
CPC ..... H04L 69/22; H04L 29/06; H04L 63/1441; H04L 63/0245; H04L 63/20;
(Continued)

(56) References Cited

U.S. PATENT DOCUMENTS

2005/0039045 A1  2/2005  Wheeler
2006/0050889 A1  3/2006  Lee
(Continued)

FOREIGN PATENT DOCUMENTS

CA    2760251 A1    11/2010
CN  101404579 A     4/2009
(Continued)

OTHER PUBLICATIONS

Bi Jun, Aug. 2009, Preventing IP source Address Spoofing:A Two-Level, State Machine-Based Method.*
(Continued)

*Primary Examiner* — Lakeram Jangbahadur
(74) *Attorney, Agent, or Firm* — Conley Rose, P.C.

(57) ABSTRACT

A packet parsing method includes a source device receives a first ciphertext from a control device, where the first ciphertext is used to verify reliability of a packet from a parsing device, and the parsing device is a trusted device selected on a path between the source device and a destination device. The source device obtains a second packet including the first ciphertext according to the first ciphertext and a first packet, and sends the second packet to the destination device. The parsing device obtains, according to the second packet and a device identifier of the parsing device, a third packet including verification information and the first ciphertext. The destination device receives the third packet from the parsing device, and verify reliability of the third packet using the verification information and the first ciphertext included in the third packet.

20 Claims, 5 Drawing Sheets

(52) U.S. Cl.
CPC ...... *H04L 63/0245* (2013.01); *H04L 63/0428* (2013.01); *H04L 63/12* (2013.01); *H04L 63/1441* (2013.01); *H04L 63/20* (2013.01)

(58) Field of Classification Search
CPC . H04L 9/0618; H04L 9/0825; H04L 63/0428; H04L 63/12; H04L 9/3247; H04L 61/30; H04L 63/0876; H04L 63/1466
See application file for complete search history.

(56) References Cited

U.S. PATENT DOCUMENTS

| | | | |
|---|---|---|---|
| 2008/0235258 | A1 | 9/2008 | Chung et al. |
| 2009/0177894 | A1 | 7/2009 | Orsini et al. |
| 2011/0202755 | A1 | 8/2011 | Orsini et al. |
| 2011/0264908 | A1 | 10/2011 | Feng et al. |
| 2014/0068269 | A1 | 3/2014 | Zhou |
| 2015/0296379 | A1* | 10/2015 | Nix .................... H04L 63/08 713/171 |
| 2016/0156597 | A1 | 6/2016 | Meng et al. |
| 2016/0285910 | A1* | 9/2016 | Galinski ............ H04L 63/0442 |
| 2017/0171219 | A1* | 6/2017 | Campagna ............ H04L 9/0841 |

FOREIGN PATENT DOCUMENTS

| | | | |
|---|---|---|---|
| CN | 102891848 | A | 1/2013 |
| CN | 103916359 | A | 7/2014 |
| CN | 104283701 | A | 1/2015 |
| CN | 105407102 | A | 3/2016 |
| EP | 1785907 | A2 | 5/2007 |
| EP | 2504973 | A2 | 10/2012 |
| WO | 2011150346 | A2 | 12/2011 |

OTHER PUBLICATIONS

Bi, J., et al., "Preventing IP Source Address Spoofing: A Two-Level, State Machine-Based Method," XP026392279, Tsinghua Science and Technology, vol. 14, No. 4, Aug. 2009, pp. 413-422.
Foreign Communication From a Counterpart Application, European Application No. 17788630.6 Partial Supplementary European Search Report dated Apr. 5, 2019, 16 pages.
Machine Translation and Abstract of Chinese Publication No. CN102891848, Jan. 23, 2013, 8 pages.
Machine Translation and Abstract of Chinese Publication No. CN103916359, Jul. 9, 2014, 10 pages.
Foreign Communication From a Counterpart Application, Chinese Application No. 201610278999.5, Chinese Search Report dated Dec. 28, 2017, 8 pages.
Foreign Communication From a Counterpart Application, PCT Application No. PCT/CN2017/080094, English Translation of International Search Report dated Jun. 30, 2017, 2 pages.
Foreign Communication From a Counterpart Application, PCT Application No. PCT/CN2017/080094, English Translation of Opinion dated Jun. 30, 2017, 7 pages.
Smith, R., "Internet Cryptography," XP002793585, Corporate and Professional Publishing Group, Reading, Mass, Dec. 31, 1997, pp. 34-35.
He, D., et al., "Lightweight and Confidential Data Discovery and Dissemination for Wireless Body Area Networks," XP011542045, IEEE Journal of Biomedical and Health Informatics, IEEE, Piscataway, NJ, USA, vol. 18, No. 2, Mar. 1, 2014, pp. 440-448.
Lashkari, A., et al., "Wired Equivalent Privacy (WEP) versus Wi-Fi Protected Access (WPA)," XP031491243, 2009 International Conference on Signal Processing Systems, IEEE, Piscataway, NJ, USA, May 15, 2009, pp. 445-449.
Foreign Communication From a Counterpart Application, European Application No. 17788630.6, Extended European Search Report dated Aug. 30, 2019, 21 pages.

* cited by examiner 192.168.1.1                192.168.1.5                192.168.1.11

| First name information | First encryption result | First ciphertext |
|---|---|---|
| <192.168.1.1; 192.168.1.5> | Digital signature (Hash<192.168.1.1; 192.168.1.5>) | ID of a device D <192.168.1.1; 192.168.1.11> |

| Second name information | Second encryption result | First ciphertext |
|---|---|---|
| <192.168.1.1; 192.168.1.11> | Digital signature (Hash<192.168.1.1; 192.168.1.11>) | ID of a device D <192.168.1.1; 192.168.1.11> |

PACKET PARSING METHOD AND DEVICE

CROSS-REFERENCE TO RELATED APPLICATIONS

This application a continuation of International Patent Application No. PCT/CN2017/080094 filed on Apr. 11, 2017, which claims priority to Chinese Patent Application No. 201610278999.5 filed on Apr. 28, 2016. The disclosures of the aforementioned applications are hereby incorporated by reference in their entireties.

TECHNICAL FIELD

The present disclosure relates to the field of communications technologies, and in particular, to a packet parsing method and a device.

BACKGROUND

In a scenario in which a plurality of types of namespace coexists, a network entity may be described using different namespace, for example, a network address of a network object and a user identifier (also referred to as ID) in an application. In a system in which a plurality of types of namespace coexists, a packet that is transmitted between different network devices and carries name information needs to be parsed. A parsing device such as a router or a gateway that completes cross namespace is vulnerable to a hacker attack. For example, in an Internet Protocol (IP) network, a field in a packet is modified to bypass filtering performed by a firewall, or a destination IP address is modified to forward a packet to a false address.

Currently, a domain name system (DNS) may be used as a parsing device, and implement secure communication using a secure communication connection to a request parsing device. However, in this method, a probability that the DNS is attacked by a hacker increases, and source reliability and integrity of a parsed result cannot be ensured.

SUMMARY

Embodiments of the present disclosure provide a packet parsing method and a device in order to ensure source reliability and integrity of a parsed result, thereby improving security.

According to a first aspect, a packet parsing method is provided, including obtaining, by a control device, a source name, a destination name, and a device identifier of a parsing device, where the source name is used to identify a source device, the destination name is used to identify a destination device, and the parsing device is a trusted device selected on a path between the source device and the destination device, obtaining, by the control device, a first ciphertext according to the source name, the destination name, and the device identifier of the parsing device, where the first ciphertext is used to verify reliability of a packet from the parsing device, and sending, by the control device, the first ciphertext to the source device.

The control device may randomly select a device from at least one trusted network device on the path between the source device and the destination device to serve as the parsing device. Because the parsing device is selected randomly and dynamically, a probability that the parsing device is attacked by a hacker is reduced, and it is ensured that parsing is completed by a specified trusted device.

The source name may be an IP address of the source device, a media access control (MAC) address of the source device, a name of the source device, or a uniform resource locator (URL) related to the source device. The destination name may be an IP address of the destination device, a MAC address of the destination device, a name of the destination device, or a URL related to the destination device.

Optionally, obtaining, by the control device, a first ciphertext according to the source name, the destination name, and the device identifier of the parsing device includes using, by the control device, the device identifier of the parsing device as an attribute, and encrypting a combination of the source name and the destination name using an attribute-based encryption (ABE) algorithm to obtain the first ciphertext.

In a possible design, the control device obtains a second ciphertext according to the source name, the destination name, and a device identifier of the source device, and the control device sends the second ciphertext to the source device.

Optionally, that the control device obtains a second ciphertext according to the source name, the destination name, and a device identifier of the source device includes using, by the control device, the device identifier of the source device as an attribute, and encrypting a combination of the source name and the destination name using an ABE algorithm to obtain the second ciphertext.

In another possible design, the control device sends conversion information to the parsing device. The conversion information may indicate a manner used to parse a packet from the source device. For example, the conversion information may instruct to parse the first ciphertext in the packet from the source device using the device identifier of the parsing device. After the source device sends the packet carrying the first ciphertext to the parsing device, the parsing device may parse the first ciphertext according to the conversion information using the device identifier of the parsing device.

In another possible design, after selecting the parsing device, the control device may send the device identifier of the parsing device to a device (which may include the parsing device and the destination device) on a path between the parsing device and the destination device. The device (which may include the parsing device and the destination device) on the path between the parsing device and the destination device may be provided with a public key of the parsing device.

In another possible design, after selecting the parsing device, the control device may send a name of the parsing device to the source device.

In another possible design, after selecting the parsing device, the control device may send the device identifier of the source device to a device (which may include the source device and the parsing device) on a path between the source device and the parsing device. The device (which may include the source device and the parsing device) on the path between the source device and the parsing device may be provided with a public key of the source device.

In another possible design, the control device may deliver a corresponding verification policy to a device on the path between the source device and the destination device. For example, the control device may deliver a first verification policy to the device on the path between the source device and the parsing device. The first verification policy is a policy used to verify the packet from the source device. The control device may deliver a second verification policy to the device on the path between the parsing device and the destination device. The second verification policy is a policy used to verify the packet from the parsing device.

According to a second aspect, a packet parsing method is provided, including receiving, by a source device, a first ciphertext sent by a control device, where the first ciphertext is used to verify reliability of a packet from a parsing device, and the parsing device is a trusted device selected on a path between the source device and a destination device, obtaining, by the source device, a second packet according to the first ciphertext and a first packet, where the first packet is a packet sent to the destination device, and the second packet includes the first ciphertext and the first packet, and sending, by the source device, the second packet to the destination device.

The first ciphertext is the same as the first ciphertext in the first aspect, and details are not described herein again.

Optionally, the source device may add the first ciphertext into a packet header of the second packet.

In a possible design, the source device receives a second ciphertext sent by the control device, the second ciphertext is used to verify reliability of a packet from the source device, and obtaining, by the source device, a second packet according to the first ciphertext and a first packet includes obtaining, by the source device, the second packet according to the first ciphertext, the second ciphertext, and the first packet. The second packet includes the first ciphertext, the second ciphertext, and the first packet.

The second ciphertext is the same as the second ciphertext in the first aspect, and details are not described herein again.

Optionally, the source device may add the second ciphertext into a packet header of the second packet.

In another possible design, the source device receives a name of the parsing device that is sent by the control device, and the source device obtains first name information and a first encryption result according to a source name and the name of the parsing device. The source name is used to identify the source device, the first name information is a combination of the source name and the name of the parsing device, the first encryption result is a result obtained after a first identity verification code is digitally signed using a private key of the source device, and the first identity verification code corresponds to the first name information.

The second packet sent by the source device may include the first ciphertext and the first packet. Alternatively, the second packet may include the first ciphertext, the first packet, and the second ciphertext. Alternatively, the second packet may include the first ciphertext, the first packet, the first name information, and the first encryption result. Alternatively, the second packet may include the first ciphertext, the first packet, the second ciphertext, the first name information, and the first encryption result.

In another possible design, the source device may obtain the second packet according to the first ciphertext, the first packet, and verification information. Further, the source device may add the verification information into the second packet, for example, adds the verification information into a packet header of the second packet.

According to a third aspect, a packet parsing method is provided, including receiving, by a parsing device, a second packet sent by a source device, where the parsing device is a trusted device selected on a path between the source device and a destination device, the second packet includes a first ciphertext and a first packet, the first packet is a packet sent to the destination device, and the first ciphertext is used to verify reliability of a packet from the parsing device, obtaining, by the parsing device, a third packet according to a device identifier of the parsing device and the second packet, where the third packet includes the first packet, the first ciphertext, and verification information, the verification information is information generated according to the device identifier of the parsing device and the first ciphertext, and the verification information is used to verify the reliability of the packet from the parsing device, and sending, by the parsing device, the third packet to the destination device.

The first ciphertext is the same as the first ciphertext in the first aspect, and details are not described herein again.

The parsing device in the foregoing implementation can obtain the verification information using the device identifier of the parsing device and the second packet such that a device receiving the third packet can verify, according to the verification information and the first ciphertext, whether the packet is tampered in a forwarding process. This improves security, and helps implement source reliability and integrity of a parsed result.

In a possible design, obtaining, by the parsing device, a third packet according to a device identifier of the parsing device and the second packet includes decrypting, by the parsing device, the first ciphertext using the device identifier of the parsing device to obtain second name information, where the second name information is a combination of a source name and a destination name, the source name is used to identify the source device, and the destination name is used to identify the destination device, obtaining, by the parsing device, the verification information according to the second name information, where the verification information includes the second name information and/or a second encryption result, the second encryption result is a result obtained after a second identity verification code is digitally signed using a private key of the parsing device, and the second identity verification code corresponds to the second name information, and obtaining, by the parsing device, the third packet according to the verification information, the first packet, and the first ciphertext.

The verification information is the second name information. Alternatively, the verification information is the second encryption result. Alternatively, the verification information includes the second name information and the second encryption result.

Optionally, if the second packet includes the first name information and the first encryption result in the second aspect, and the verification information includes the second name information and the second encryption result, a method for obtaining the third packet by the parsing device may be replacing, by the parsing device, the first name information in the second packet with the second name information, and replacing the first encryption result in the second packet with the second encryption result to obtain the third packet.

In another possible design, the second packet further includes first name information and a first encryption result. The first name information is a combination of the source name and a name of the parsing device, the source name is used to identify the source device, the first encryption result is a result obtained after a first identity verification code is digitally signed using a private key of the source device, and the first identity verification code corresponds to the first name information. The method further includes decrypting, by the parsing device, the first encryption result using a public key of the source device to obtain the first identity verification code, and after determining, according to the first name information and the first identity verification code, that the first identity verification code matches the first name information, verifying, by the parsing device, that the second packet is not tampered.

A method using which the parsing device determines that the first identity verification code corresponds to the first name information includes performing, by the parsing device, hash calculation on the first name information to obtain a hash value, and after determining that the first identity verification code matches the hash value, determining, by the parsing device, that the first identity verification code corresponds to the first name information. That the first identity verification code matches the hash value may be that the first identity verification code is the same as the hash value, or may be that a difference between the first identity verification code and the hash value falls within a threshold range.

In another possible design, the second packet further includes a second ciphertext, the second ciphertext is used to verify reliability of a packet from the source device, and the method further includes verifying, by the parsing device, that the second packet is not tampered after determining that the second ciphertext can be decrypted using a device identifier of the source device.

A method using which the parsing device verifies whether the second packet from the source device is tampered may be the first verification policy mentioned in the first aspect.

Optionally, after verifying that the second packet from the source device is not tampered, the parsing device may execute a procedure of obtaining the third packet. Alternatively, after verifying that the second packet from the source device is not tampered, the parsing device may execute a procedure of sending the third packet to the destination device. In this way, the parsing device may further verify the second packet from the source device in order to prevent the second packet from being tampered in a transmission process. This helps improve security, and helps ensure source reliability and parsing integrity.

Optionally, a device on a path between the source device and the parsing device may verify, using a method the same as that of the parsing device, whether the second packet from the source device is tampered. After determining that the second packet from the source device is not tampered, the device on the path between the source device and the parsing device may forward the second packet to a next hop on the path, that is, sends the second packet in a direction of the destination device along the path.

According to a fourth aspect, a packet parsing method is provided, including receiving, by a destination device, a second packet sent by a parsing device, where the parsing device is a trusted device selected on a path between a source device and the destination device, the second packet includes a first packet, a first ciphertext, and verification information, the first packet is a packet sent to the destination device, the first ciphertext is used to verify reliability of a packet from the parsing device, the verification information is information generated according to a device identifier of the parsing device and the first ciphertext, and the verification information is used to verify the reliability of the packet from the parsing device, and verifying, by the destination device, reliability of the second packet according to the first ciphertext and the verification information.

The first ciphertext is the same as the first ciphertext in the first aspect, and the verification information is the same as the verification information in the third aspect. Details are not described herein again.

In a possible design, the verification information includes an encryption result and first name information, the encryption result is a result obtained after an identity verification code is digitally signed using a private key of the parsing device, the identity verification code corresponds to the first name information, the first name information is a combination of a source name and a destination name, the source name is used to identify the source device, and the destination name is used to identify the destination device. The verifying, by the destination device, reliability of the second packet according to the first ciphertext and the verification information includes decrypting, by the destination device, the encryption result using a public key of the parsing device to obtain the identity verification code, and determining, by the destination device, that the second packet is not tampered after determining that the identity verification code matches the first name information.

A method for determining whether the identity verification code matches the first name information is the same as the method for determining whether the first identity verification code matches the first name information in the third aspect. Details are not described herein again.

In another possible design, the verification information includes first name information, the first name information is a combination of a source name and a destination name, the source name is used to identify the source device, and the destination name is used to identify the destination device. Verifying, by the destination device, reliability of the second packet according to the first ciphertext and the verification information includes decrypting, by the destination device, the first ciphertext using the device identifier of the parsing device to obtain second name information, where the second name information is the combination of the source name and the destination name, and determining, by the destination device, that the second packet is not tampered after determining that the first name information is the same as the second name information.

In another possible design, the verification information includes an encryption result, the encryption result is a result obtained after an identity verification code is digitally signed using a private key of the parsing device, the identity verification code corresponds to the first name information, the first name information is a combination of a source name and a destination name, the source name is used to identify the source device, and the destination name is used to identify the destination device. The verifying, by the destination device, reliability of the second packet according to the first ciphertext and the verification information includes parsing, by the destination device, the first ciphertext using the device identifier of the parsing device to obtain second name information, where the second name information is the combination of the source name and the destination name, decrypting, by the destination device, the encryption result using a public key of the parsing device to obtain the identity verification code, and determining, by the destination device, that the second packet is not tampered after determining that the identity verification code matches the second name information.

A method for determining whether the identity verification code matches the second name information is the same as the method for determining whether the first identity verification code matches the first name information in the third aspect. Details are not described herein again.

According to a fifth aspect, an embodiment of this application provides a control device, where the control device is configured to perform the method in the first aspect or any possible implementation of the first aspect. In an implementation, the control device includes units that are configured to perform the method in the first aspect or any possible implementation of the first aspect. In another implementation, the control device includes a processor, a memory, a communication port, and a communications bus. The processor, the memory, and the communication port communicate with each other using the communications bus. The processor is configured to perform the method in the first aspect or any possible implementation of the first aspect.

According to a sixth aspect, an embodiment of this application provides a source device, where the source device is configured to perform the method in the second aspect or any possible implementation of the second aspect. In an implementation, the source device includes units that are configured to perform the method in the second aspect or any possible implementation of the second aspect. In another implementation, the source device includes a processor, a memory, a communication port, and a communications bus. The processor, the memory, and the communication port communicate with each other using the communications bus. The processor is configured to perform the method in the second aspect or any possible implementation of the second aspect.

According to a seventh aspect, an embodiment of this application provides a parsing device, where the parsing device is configured to perform the method in the third aspect or any possible implementation of the third aspect. In an implementation, the parsing device includes units that are configured to perform the method in the third aspect or any possible implementation of the third aspect. In another implementation, the parsing device includes a processor, a memory, a communication port, and a communications bus. The processor, the memory, and the communication port communicate with each other using the communications bus. The processor is configured to perform the method in the third aspect or any possible implementation of the third aspect.

According to an eighth aspect, an embodiment of this application provides a destination device, where the destination device is configured to perform the method in the fourth aspect or any possible implementation of the fourth aspect. In an implementation, further, the destination device includes units that are configured to perform the method in the fourth aspect or any possible implementation of the fourth aspect. In another implementation, the destination device includes a processor, a memory, a communication port, and a communications bus. The processor, the memory, and the communication port communicate with each other using the communications bus. The processor is configured to perform the method in the fourth aspect or any possible implementation of the fourth aspect.

DESCRIPTION OF EMBODIMENTS

The following describes the technical solutions in the embodiments of the present disclosure with reference to the accompanying drawings in the embodiments of the present disclosure.

Figure 1:
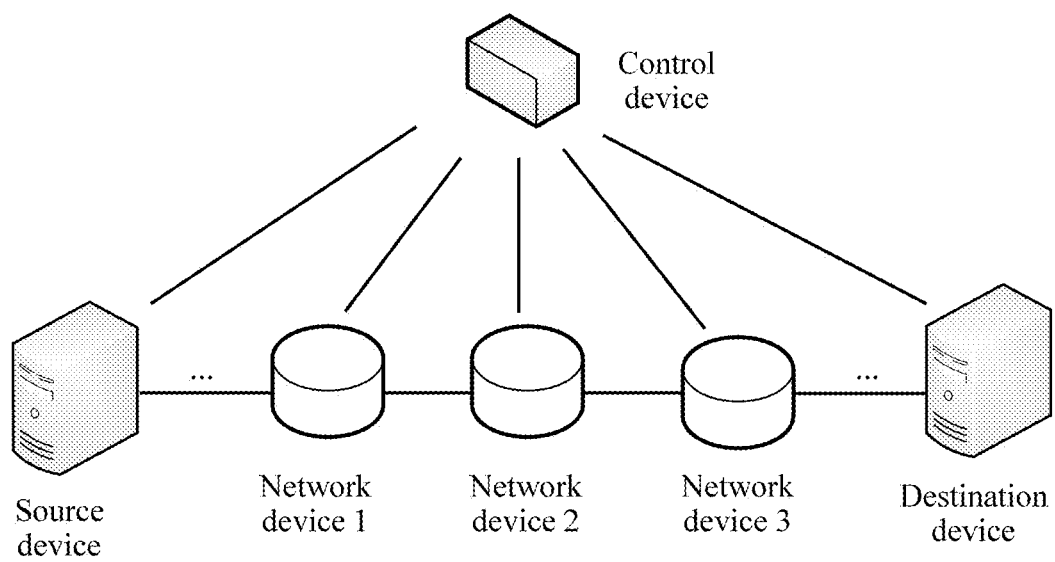
FIG. 1 is a schematic structural diagram of a packet parsing system according to an embodiment of the present disclosure.

As shown in FIG. 1, FIG. 1 is a schematic structural diagram of a packet parsing system according to an embodiment of the present disclosure. The system includes a source device, a destination device, a plurality of network devices (designated as a network device 1, a network device 2, and a network device 3), and a control device. A packet needs to be forwarded by the plurality of network devices before being transmitted from the source device to the destination device. The control device stores device identifiers of the source device, the destination device, and each device in the plurality of network devices. In an actual scenario of this embodiment of the present disclosure, packet forwarding needs to span a plurality of different network protocols. Because an edge gateway cannot automatically parse a destination address, the packet first needs to be sent to the control device for processing. A specific processing process is as follows.

Figure 2:
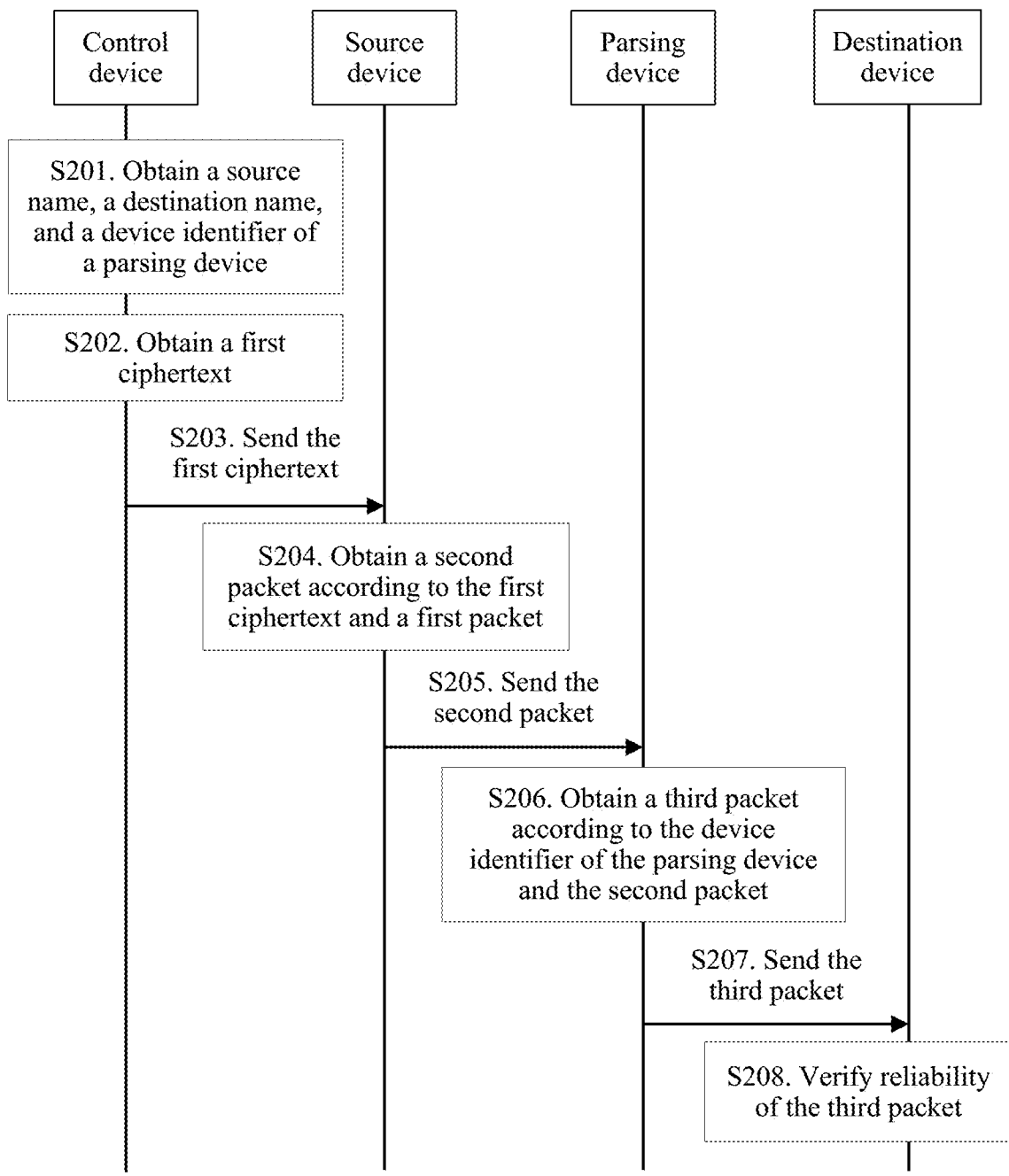
FIG. 2 is a flowchart of a packet parsing method according to an embodiment of the present disclosure.

As shown in FIG. 2, FIG. 2 is a flowchart of a packet parsing method according to an embodiment of the present disclosure. As shown in FIG. 2, the method in this embodiment of the present disclosure includes the following steps.

Step S201. A control device obtains a source name, a destination name, and a device identifier of a parsing device, where the source name is used to identify a source device, the destination name is used to identify a destination device, and the parsing device is a trusted device selected on a path between the source device and the destination device.

During specific implementation, the control device may randomly select a device from at least one trusted network device on the path between the source device and the destination device to serve as the parsing device, and then obtain the source name, the destination name, and the device identifier of the parsing device. Because the parsing device is selected randomly and dynamically, a probability that the parsing device is attacked by a hacker is reduced, and it is ensured that parsing is completed by a specified trusted device. The source name may be an IP address of the source device, a MAC address of the source device, a name of the source device, or a URL related to the source device. The destination name may be an IP address of the destination device, a MAC address of the destination device, a name of the destination device, or a URL related to the destination device.

During specific implementation, a user may specify a destination address for packet forwarding. When an edge gateway (the following source device) cannot automatically parse the destination address, the control device determines how many times namespace conversion needs to be performed on a packet before the packet is forwarded from the source device to a target device. In each namespace conversion process, a trusted network device is randomly selected from a plurality of network devices on a path between the source device and the target device according to a specified algorithm to serve as the parsing device. Namespace conversion indicates encryption and parsing processing performed on the packet.

Step S202. The control device obtains a first ciphertext according to the source name, the destination name, and the device identifier of the parsing device, where the first ciphertext is used to verify reliability of a packet from the parsing device.

During specific implementation, the control device uses the device identifier of the parsing device as an attribute, and encrypts a combination of the source name and the destination name using an ABE algorithm to obtain the first ciphertext.

Optionally, the control device may obtain a second ciphertext according to the source name, the destination name, and a device identifier of the source device, and then send the second ciphertext to the source device. Further, the control device may use the device identifier of the source device as an attribute, and encrypt a combination of the source name and the destination name using an ABE algorithm, to obtain the second ciphertext.

Step S203. The control device sends the first ciphertext to the source device.

Optionally, the control device may send conversion information to the parsing device. The conversion information may indicate a manner used to parse a packet from the source device. For example, the conversion information may instruct to parse the first ciphertext in the packet from the source device using the device identifier of the parsing device. After the source device sends the packet carrying the first ciphertext to the parsing device, the parsing device may parse the first ciphertext according to the conversion information using the device identifier of the parsing device.

Optionally, the control device may send the device identifier of the parsing device to a device (which may include the parsing device and the destination device) on a path between the parsing device and the destination device. The device (which may include the parsing device and the destination device) on the path between the parsing device and the destination device may be provided with a public key of the parsing device.

Optionally, the control device may send a name of the parsing device to the source device, and may further send the device identifier of the source device to a device (which may include the source device and the parsing device) on a path between the source device and the parsing device. The device (which may include the source device and the parsing device) on the path between the source device and the parsing device may be provided with a public key of the source device.

Optionally, the control device may deliver a corresponding verification policy to a device on the path between the source device and the destination device. For example, the control device may deliver a first verification policy to the device on the path between the source device and the parsing device. The first verification policy is a policy used to verify the packet from the source device. The control device may deliver a second verification policy to the device on the path between the parsing device and the destination device. The second verification policy is a policy used to verify the packet from the parsing device.

Step S204. The source device obtains a second packet according to the first ciphertext and a first packet, where the second packet includes the first ciphertext and the first packet.

During specific implementation, the source device may add the first ciphertext into a packet header of the second packet.

Optionally, the source device may receive a second ciphertext sent by the control device, and after receiving the second ciphertext, obtain the second packet according to the first ciphertext, the second ciphertext, and the first packet. The second packet includes the first ciphertext, the second ciphertext, and the first packet. Further, the source device may add the second ciphertext into the packet header of the second packet.

Optionally, the source device may receive a name of the parsing device that is sent by the control device, and the source device obtains first name information and a first encryption result according to the source name and the name of the parsing device. The first name information is a combination of the source name and the name of the parsing device, and the first encryption result is a result obtained after a first identity verification code is digitally signed using a private key of the source device. The first identity verification code corresponds to the first name information, and the first identity verification code may be a hash value obtained through calculation according to the first name information. The source device may add the first encryption result and the first name information into the second packet.

The source device may add the first name information and the first encryption result into a packet header of the second packet. The first encryption result and the first name information may be displayed in the packet header in a plaintext manner.

Step S205. The source device sends the second packet to the parsing device.

Step S206. The parsing device obtains a third packet according to the device identifier of the parsing device and the second packet, where the third packet includes the first packet, the first ciphertext, and verification information, the verification information is information generated according to the device identifier of the parsing device and the first ciphertext, and the verification information is used to verify the reliability of the packet from the parsing device.

During specific implementation, the verification information can be obtained using the device identifier of the parsing device and the second packet. Further, the parsing device decrypts the first ciphertext using the device identifier of the parsing device to obtain second name information. The second name information is a combination of the source name and a destination name, and the destination name is used to identify the destination device. The parsing device obtains the verification information according to the second name information. The verification information includes the second name information and/or a second encryption result, the second encryption result is a result obtained after a second identity verification code is digitally signed using a private key of the parsing device, and the second identity verification code corresponds to the second name information. The parsing device obtains the third packet according to the verification information, the first packet, and the first ciphertext such that a device receiving the third packet can verify, according to the verification information and the first ciphertext, whether the packet is tampered in a forwarding process. This improves security, and helps implement source reliability and integrity of a parsed result.

The verification information is the second name information. Alternatively, the verification information is the second encryption result. Alternatively, the verification information includes the second name information and the second encryption result.

Optionally, if the second packet includes the first name information and the first encryption result, and the verification information includes the second name information and the second encryption result, a method for obtaining the third packet by the parsing device may include replacing, by the parsing device, the first name information in the second packet with the second name information, and replacing the first encryption result in the second packet with the second encryption result to obtain the third packet.

Step S207. The parsing device sends the third packet to the destination device.

Step S208. The destination device verifies reliability of the third packet according to the first ciphertext and the verification information.

During specific implementation, the verification information includes a second encryption result and second name information. The second encryption result is a result obtained after a second identity verification code is digitally signed using a private key of the parsing device, the second identity verification code corresponds to the second name information, and the second name information is a combination of a source name and a destination name. The destination device decrypts the encryption result using a public key of the parsing device to obtain the second identity verification code, and after determining that the second identity verification code matches the second name information, the destination device determines that the third packet is not tampered. A method for determining whether the second identity verification code matches the second name information is the same as the method for determining whether the first identity verification code matches the first name information. Details are not described herein again.

Optionally, the verification information includes second name information, and the second name information is a combination of a source name and a destination name. The destination device decrypts the first ciphertext using the device identifier of the parsing device to obtain third name information, and the third name information is the combination of the source name and the destination name. After determining that the third name information is the same as the second name information, the destination device determines that the third packet is not tampered. This indicates that the parsing device is a trusted device.

Optionally, the verification information includes a second encryption result, and the second encryption result is a result obtained after a second identity verification code is digitally signed using a private key of the parsing device. The second identity verification code corresponds to second name information, and the second name information is a combination of a source name and a destination name. The destination device parses the first ciphertext using the device identifier of the parsing device to obtain the second name information. The second name information is the combination of the source name and the destination name. The destination device decrypts the second encryption result using the public key of the parsing device to obtain the second identity verification code. After determining that the second identity verification code matches the second name information, the destination device determines that the third packet is not tampered, that is, determines that a parsing result obtained by the parsing device is not tampered. A method for determining whether the second identity verification code matches the second name information is the same as the method for determining whether the first identity verification code matches the first name information. Details are not described herein again.

A network device on a path between the parsing device and the destination device may verify the received third packet using the verification method, that is, the method used by the destination device to verify the third packet in order to determine that the third packet obtained by the parsing device is not tampered in a transmission process, and the parsing device is a trusted device.

After step S205, the method provided in this embodiment of the present disclosure may further include verifying, by the parsing device, the second packet from the source device. Optionally, after verifying that the second packet from the source device is not tampered, the parsing device may execute a procedure of obtaining the third packet. Alternatively, after verifying that the second packet from the source device is not tampered, the parsing device may execute a procedure of sending the third packet to the destination device. In this way, the parsing device may further verify the second packet from the source device in order to prevent the second packet from being tampered in a transmission process. This helps improve security, and helps ensure source reliability and parsing integrity.

For example, the parsing device verifies the second packet from the source device in the following two manners.

Manner 1:

The second packet further includes the first name information and the first encryption result. The first name information is the combination of the source name and the name of the parsing device, the first encryption result is the result obtained after the first identity verification code is digitally signed using the private key of the source device, and the first identity verification code corresponds to the first name information. Further, the parsing device decrypts the first encryption result using the public key of the source device to obtain the first identity verification code, and after determining, according to the first name information and the first identity verification code, that the first identity verification code matches the first name information, the parsing device verifies that the second packet is not tampered.

A method using which the parsing device determines that the first identity verification code corresponds to the first name information includes performing, by the parsing device, hash calculation on the first name information to obtain a hash value, and determining, by the parsing device, that the first identity verification code corresponds to the first name information after determining that the first identity verification code matches the hash value. That the first identity verification code matches the hash value may be that the first identity verification code is the same as the hash value, or may be that a difference between the first identity verification code and the hash value falls within a threshold range.

Manner 2:

The second packet further includes the second ciphertext, and the parsing device may further verify reliability of the second packet using the second ciphertext. Further, after determining that the second ciphertext can be decrypted using a device identifier of the source device, the parsing device verifies that the second packet is not tampered.

A method using which the parsing device verifies whether the second packet from the source device is tampered may be the first verification policy mentioned above.

In addition, a device on the path between the source device and the parsing device may verify, using a method the same as that of the parsing device, whether the second packet from the source device is tampered. After determining that the second packet from the source device is not tampered, the device on the path between the source device and the parsing device may forward the second packet to a next hop on the path, that is, sends the second packet in a direction of the destination device along the path.

Figures 3, 4, 5:
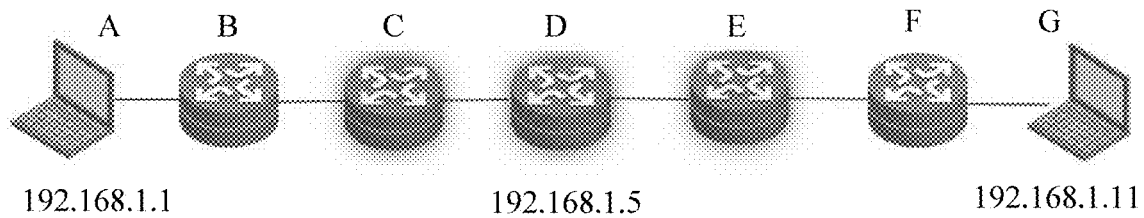
FIG. 3 is a schematic structural diagram of another packet parsing system according to an embodiment of the present disclosure.
FIG. 4 is a schematic structural diagram of a data packet according to an embodiment of the present disclosure.
FIG. 5 is a schematic structural diagram of another data packet according to an embodiment of the present disclosure.

As shown in FIG. 3, a packet is forwarded from a device A (192.168.1.1) to a device G (192.168.1.11). The device A is a source device, and the device G is a destination device. There is a plurality of intermediate devices between the device A and the device G, for example, a device B, a device C, a device D, a device E, and a device F. A control device randomly selects a trusted device such as the device D from the device C, the device D, and the device E to serve as a parsing device. The control device uses a device identifier of the device D as an attribute, and performs ABE encryption on a name of the device A (192.168.1.1) and a name of the device G (192.168.1.11) to obtain a first ciphertext. The control device sends the first ciphertext to the device A.

After receiving the first ciphertext, the device A adds the first ciphertext into a packet header of a second packet. Therefore, the second packet includes the first ciphertext and a first packet that needs to be sent to the device G. As shown in FIG. 4, FIG. 4 is the packet header of the second packet. The packet header of the second packet may include the first ciphertext, a first encryption result, and first name information. The first name information is a combination of the name of the device A (192.168.1.1) and a name of the device D (192.168.1.5). The first encryption result is a result obtained after a first identity verification code is digitally signed using a private key of the device A. The first identity verification code is a hash value obtained through calculation according to the name of the device A (192.168.1.1) and the name of the device D (192.168.1.5). The first encryption result and the first name information are optional parameters. The device A sends the second packet to the device D.

After receiving the second packet, the device D obtains a third packet according to the device identifier of the device D and the second packet. As shown in FIG. 5, FIG. 5 is a packet header of the third packet. The packet header of the third packet includes second name information, a second encryption result, and the first ciphertext. The second name information is a combination of the name of the device A (192.168.1.1) and the name of the device G (192.168.1.11), the second encryption result is a result obtained after a second identity verification code is digitally signed using a private key of the device D, and the second identity verification code is a hash value obtained through calculation according to the name of the device A (192.168.1.1) and the name of the device G (192.168.1.11).

The device E, the device F, and the device G all can verify the third packet from the device D. In an example in which the device E verifies the third packet, the device E may verify the third packet in the following two manners.

Manner 1:

The device E decrypts the second encryption result using a public key of the device D to obtain the second identity verification code. If the device E determines that the second identity verification code matches the second name information, the device E determines that the third packet is not tampered, and the device D is a trusted parsing device.

Manner 2:

The device E uses the device identifier of the device D as an attribute, and decrypts the first ciphertext, to obtain third name information. If the device E determines that the third name information is the same as the second name information, the device E determines that the third packet is not tampered, and the device D is a trusted parsing device.

It should be noted that the device B, the device C, and the device D also need to verify a data packet from the device A, to ensure that the second packet sent by the device A is not tampered by another device, and the device A is also a trusted device.

In this embodiment of the present disclosure, first, the control device obtains the source name, the destination name, and the device identifier of the parsing device, obtains the first ciphertext according to the source name, the destination name, and the device identifier of the parsing device, and sends the first ciphertext to the source device. Then, after receiving the first ciphertext, the source device obtains the second packet according to the first ciphertext and the first packet, and sends the second packet to the parsing device. Next, after receiving the second packet, the parsing device obtains the third packet according to the device identifier of the parsing device and the second packet, and sends the third packet to the destination device. Finally, the destination device verifies the reliability of the third packet according to the first ciphertext and the verification information. Therefore, source reliability and integrity of a parsed result are ensured, and security is improved.

Figure 6:
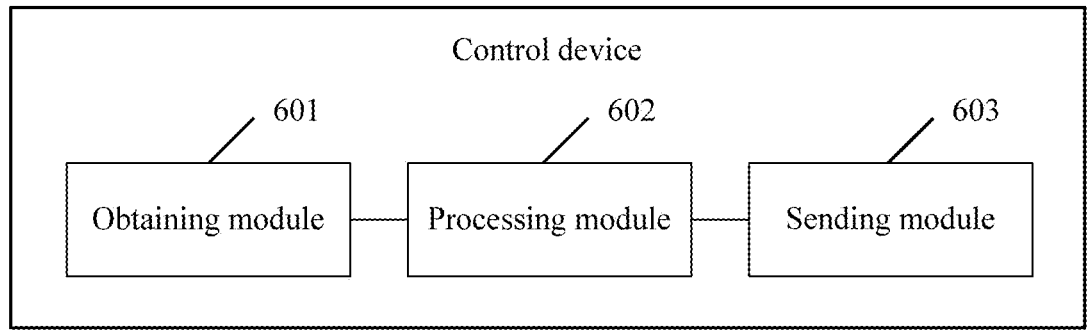
FIG. 6 is a schematic structural diagram of a control device according to an embodiment of the present disclosure.

Referring to FIG. 6, FIG. 6 is a schematic structural diagram of a control device according to an embodiment of the present disclosure. The control device shown in FIG. 6 may use the method used by the control device in the embodiment corresponding to FIG. 2, that is, the control device shown in FIG. 6 may be the control device in the embodiment corresponding to FIG. 2. As shown in FIG. 6, the control device in this embodiment of the present disclosure includes an obtaining module 601, a processing module 602, and a sending module 603.

The obtaining module 601 is configured to obtain a source name, a destination name, and a device identifier of a parsing device. The source name is used to identify a source device, the destination name is used to identify a destination device, and the parsing device is a trusted device selected on a path between the source device and the destination device.

During specific implementation, a device may be randomly selected from at least one trusted network device on the path between the source device and the destination device to serve as the parsing device, and then the source name, the destination name, and the device identifier of the parsing device may be obtained. Because the parsing device is selected randomly and dynamically, a probability that the parsing device is attacked by a hacker is reduced, and it is ensured that parsing is completed by a specified trusted device. The source name may be an IP address of the source device, a MAC address of the source device, a name of the source device, or a URL related to the source device. The destination name may be an IP address of the destination device, a MAC address of the destination device, a name of the destination device, or a URL related to the destination device.

The processing module 602 is configured to obtain a first ciphertext according to the source name, the destination name, and the device identifier of the parsing device. The first ciphertext is used to verify reliability of a packet from the parsing device.

During specific implementation, the device identifier of the parsing device may be used as an attribute, and a combination of the source name and the destination name may be encrypted using an ABE algorithm to obtain the first ciphertext.

Optionally, the processing module 602 may further obtain a second ciphertext according to the source name, the destination name, and a device identifier of the source device. Then, the second ciphertext is sent to the source device. Further, the device identifier of the source device may be used as an attribute, and a combination of the source name and the destination name may be encrypted using an ABE algorithm to obtain the second ciphertext.

The sending module 603 is configured to send the first ciphertext to the source device.

Optionally, the sending module 603 may send conversion information to the parsing device. The conversion information may indicate a manner used to parse a packet from the source device. For example, the conversion information may instruct to parse the first ciphertext in the packet from the source device using the device identifier of the parsing device. After the source device sends the packet carrying the first ciphertext to the parsing device, the parsing device may parse the first ciphertext according to the conversion information using the device identifier of the parsing device.

Optionally, the sending module 603 may send the device identifier of the parsing device to a device (which may include the parsing device and the destination device) on a path between the parsing device and the destination device. The device (which may include the parsing device and the destination device) on the path between the parsing device and the destination device may be provided with a public key of the parsing device.

Optionally, the sending module 603 may send a name of the parsing device to the source device, and may further send the device identifier of the source device to a device (which may include the source device and the parsing device) on a path between the source device and the parsing device. The device (which may include the source device and the parsing device) on the path between the source device and the parsing device may be provided with a public key of the source device.

Optionally, the sending module 603 may deliver a corresponding verification policy to a device on the path between the source device and the destination device. For example, the control device may deliver a first verification policy to the device on the path between the source device and the parsing device. The first verification policy is a policy used to verify the packet from the source device. The control device may deliver a second verification policy to the device on the path between the parsing device and the destination device. The second verification policy is a policy used to verify the packet from the parsing device.

Figure 7:
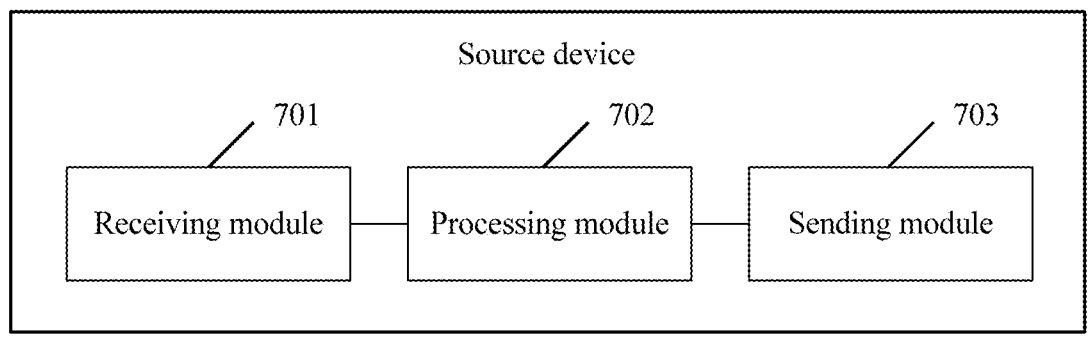
FIG. 7 is a schematic structural diagram of a source device according to an embodiment of the present disclosure.

Referring to FIG. 7, FIG. 7 is a schematic structural diagram of a source device according to an embodiment of the present disclosure. The source device shown in FIG. 7 may use the method used by the source device in the embodiment corresponding to FIG. 2, that is, the source device shown in FIG. 7 may be the source device in the embodiment corresponding to FIG. 2. As shown in FIG. 7, the source device in this embodiment of the present disclosure includes a receiving module 701, a processing module 702, and a sending module 703.

The receiving module 701 is configured to receive a first ciphertext sent by a control device. The first ciphertext is used to verify reliability of a packet from a parsing device, and the parsing device is a trusted device selected on a path between the source device and a destination device.

During specific implementation, the control device first obtains a source name, a destination name, and a device identifier of the parsing device. The source name is used to identify the source device, the destination name is used to identify the destination device, and the parsing device is the trusted device selected on the path between the source device and the destination device. Then, the control device obtains the first ciphertext according to the source name, the destination name, and the device identifier of the parsing device. Finally, the control device sends the first ciphertext to the source device.

The processing module 702 is configured to obtain a second packet according to the first ciphertext and a first packet. The first packet is a packet sent to the destination device, and the second packet includes the first ciphertext and the first packet.

During specific implementation, the source device may add the first ciphertext into a packet header of the second packet.

Optionally, the source device may receive a second ciphertext sent by the control device, and after receiving the second ciphertext, obtain the second packet according to the first ciphertext, the second ciphertext, and the first packet. The second packet includes the first ciphertext, the second ciphertext, and the first packet. Further, the source device may add the second ciphertext into a packet header of the second packet.

Optionally, the source device may receive a name of the parsing device that is sent by the control device, and the source device obtains first name information and a first encryption result according to a source name and the name of the parsing device. The first name information is a combination of the source name and the name of the parsing device, and the first encryption result is a result obtained after a first identity verification code is digitally signed using a private key of the source device. The first identity verification code corresponds to the first name information, and the first identity verification code may be a hash value obtained through calculation according to the first name information.

The sending module 703 is configured to send the second packet to the destination device.

Figure 8:
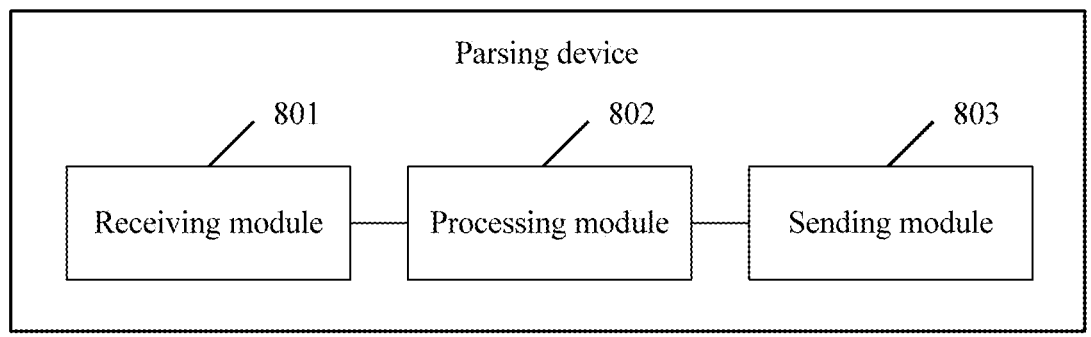
FIG. 8 is a schematic structural diagram of a parsing device according to an embodiment of the present disclosure.

Referring to FIG. 8, FIG. 8 is a schematic structural diagram of a parsing device according to an embodiment of the present disclosure. The parsing device shown in FIG. 8 may use the method used by the parsing device in the embodiment corresponding to FIG. 2, that is, the parsing device shown in FIG. 8 may be the parsing device in the embodiment corresponding to FIG. 2. As shown in FIG. 8, the parsing device in this embodiment of the present disclosure includes a receiving module 801, a processing module 802, and a sending module 803.

The receiving module 801 is configured to receive a second packet sent by a source device. The parsing device is a trusted device selected on a path between the source device and a destination device, the second packet includes a first ciphertext and a first packet, the first packet is a packet sent to the destination device, and the first ciphertext is used to verify reliability of a packet from the parsing device.

The processing module 802 is configured to obtain a third packet according to a device identifier of the parsing device and the second packet. The third packet includes the first packet, the first ciphertext, and verification information, the verification information is information generated according to the device identifier of the parsing device and the first ciphertext, and the verification information is used to verify the reliability of the packet from the parsing device.

During specific implementation, the verification information can be obtained using the device identifier of the parsing device and the second packet. Further, the parsing device decrypts the first ciphertext using the device identifier of the parsing device to obtain second name information. The second name information is a combination of a source name and a destination name, and the destination name is used to identify the destination device. The parsing device obtains the verification information according to the second name information. The verification information includes the second name information and/or a second encryption result, the second encryption result is a result obtained after a second identity verification code is digitally signed using a private key of the parsing device, and the second identity verification code corresponds to the second name information. The parsing device obtains the third packet according to the verification information, the first packet, and the first ciphertext such that a device receiving the third packet can verify, according to the verification information and the first ciphertext, whether the packet is tampered in a forwarding process. This improves security, and helps implement source reliability and integrity of a parsed result.

The verification information is the second name information. Alternatively, the verification information is the second encryption result. Alternatively, the verification information includes the second name information and the second encryption result.

Optionally, if the second packet includes the first name information and the first encryption result, and the verification information includes the second name information and the second encryption result, a method for obtaining the third packet by the parsing device may include replacing, by the parsing device, the first name information in the second packet with the second name information, and replacing the first encryption result in the second packet with the second encryption result, to obtain the third packet.

Optionally, the second packet further includes first name information and a first encryption result. The first name information is a combination of the source name and a name of the parsing device, the first encryption result is a result obtained after a first identity verification code is digitally signed using a private key of the source device, and the first identity verification code corresponds to the first name information. The parsing device may verify the second packet. Further, the parsing device decrypts the first encryption result using a public key of the source device to obtain the first identity verification code, and after determining, according to the first name information and the first identity verification code, that the first identity verification code matches the first name information, the parsing device verifies that the second packet is not tampered.

A method using which the parsing device determines that the first identity verification code corresponds to the first name information is performing, by the parsing device, hash calculation on the first name information to obtain a hash value, and after determining that the first identity verification code matches the hash value, determining, by the parsing device, that the first identity verification code corresponds to the first name information. That the first identity verification code matches the hash value may be that the first identity verification code is the same as the hash value, or may be that a difference between the first identity verification code and the hash value falls within a threshold range.

Optionally, the second packet further includes a second ciphertext, and the parsing device may further verify reliability of the second packet using the second ciphertext. Further, after determining that the second ciphertext can be decrypted using a device identifier of the source device, the parsing device verifies that the second packet is not tampered.

A method using which the parsing device verifies whether the second packet from the source device is tampered may be the first verification policy mentioned above.

Optionally, after verifying that the second packet from the source device is not tampered, the parsing device may execute a procedure of obtaining the third packet. Alternatively, after verifying that the second packet from the source device is not tampered, the parsing device may execute a procedure of sending the third packet to the destination device. In this way, the parsing device may further verify the second packet from the source device in order to prevent the second packet from being tampered in a transmission process. This helps improve security, and helps ensure source reliability and parsing integrity.

In addition, a device on a path between the source device and the parsing device may verify, using a method the same as that of the parsing device, whether the second packet from the source device is tampered. After determining that the second packet from the source device is not tampered, the device on the path between the source device and the parsing device may forward the second packet to a next hop on the path, that is, sends the second packet in a direction of the destination device along the path.

The sending module 803 is configured to send the third packet to the destination device.

Figure 9:
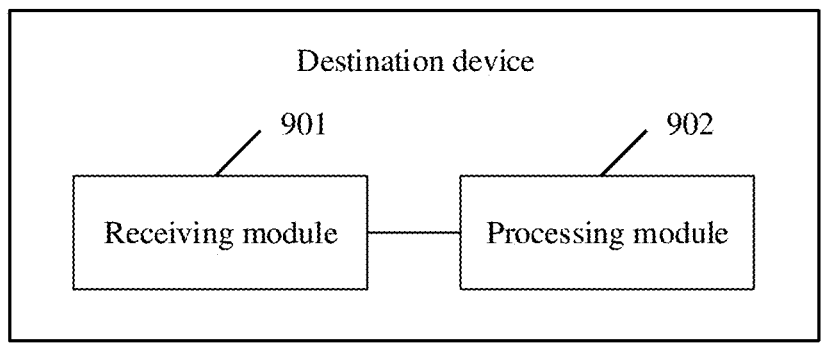
FIG. 9 is a schematic structural diagram of a destination device according to an embodiment of the present disclosure.

Referring to FIG. 9, FIG. 9 is a schematic structural diagram of a destination device according to an embodiment of the present disclosure. The destination device shown in FIG. 9 may use the method used by the destination device in the embodiment corresponding to FIG. 2, that is, the destination device shown in FIG. 9 may be the destination device in the embodiment corresponding to FIG. 2. As shown in FIG. 9, the destination device in this embodiment of the present disclosure includes a receiving module 901 and a processing module 902.

The receiving module 901 is configured to receive a third packet sent by a parsing device. The parsing device is a trusted device selected on a path between a source device and the destination device, the third packet includes a first packet, a first ciphertext, and verification information, the first packet is a packet sent to the destination device, the first ciphertext is used to verify reliability of a packet from the parsing device, the verification information is information generated according to a device identifier of the parsing device and the first ciphertext, and the verification information is used to verify the reliability of the packet from the parsing device.

The processing module 902 is configured to verify reliability of the third packet according to the first ciphertext and the verification information.

During specific implementation, the verification information includes a second encryption result and second name information. The second encryption result is a result obtained after a second identity verification code is digitally signed using a private key of the parsing device, the second identity verification code corresponds to the second name information, and the second name information is a combination of a source name and a destination name. The destination device decrypts the encryption result using a public key of the parsing device to obtain the second identity verification code, and after determining that the second identity verification code matches the second name information, the destination device determines that the third packet is not tampered. A method for determining whether the second identity verification code matches the second name information is the same as the method for determining whether the first identity verification code matches the first name information. Details are not described herein again.

Optionally, the verification information includes second name information, and the second name information is a combination of a source name and a destination name. The destination device decrypts the first ciphertext using the device identifier of the parsing device to obtain third name information, and the third name information is the combination of the source name and the destination name. After determining that the third name information is the same as the second name information, the destination device determines that the third packet is not tampered.

Optionally, the verification information includes a second encryption result, and the second encryption result is a result obtained after a second identity verification code is digitally signed using a private key of the parsing device. The second identity verification code corresponds to second name information, and the second name information is a combination of a source name and a destination name. The destination device parses the first ciphertext using the device identifier of the parsing device to obtain the second name information. The second name information is the combination of the source name and the destination name. The destination device decrypts the second encryption result using a public key of the parsing device to obtain the second identity verification code. After determining that the second identity verification code matches the second name information, the destination device determines that the third packet is not tampered. A method for determining whether the second identity verification code matches the second name information is the same as the method for determining whether the first identity verification code matches the first name information. Details are not described herein again.

Figure 10:
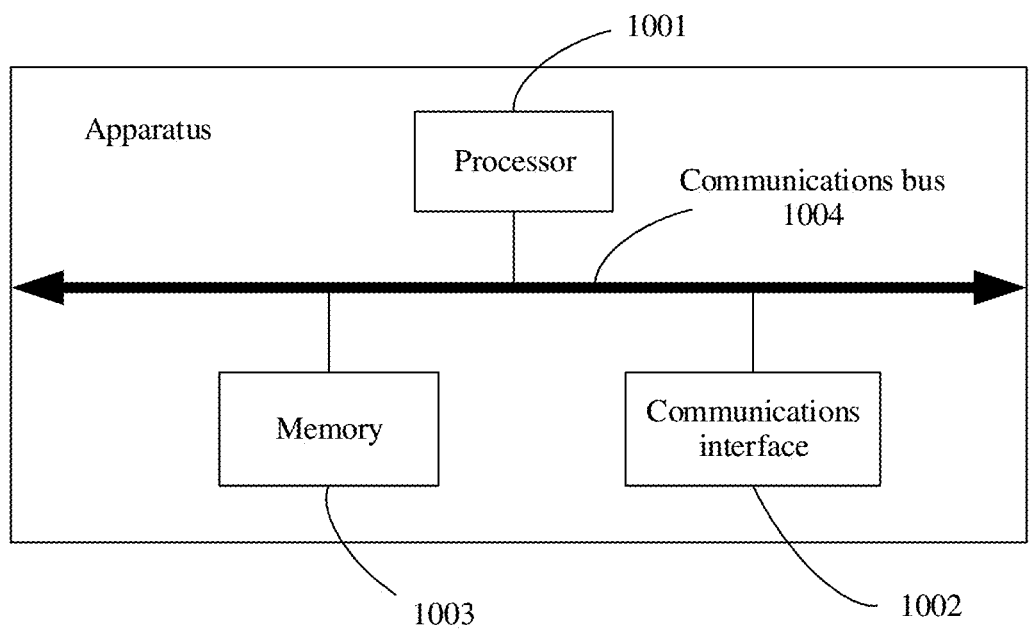
FIG. 10 is a schematic structural diagram of an apparatus according to an embodiment of the present disclosure.

Further referring to FIG. 10, FIG. 10 is a schematic structural diagram of an apparatus according to an embodiment of the present disclosure. As shown in FIG. 10, the apparatus may include at least one processor 1001 such as a central processing unit (CPU), at least one communications interface 1002, at least one memory 1003, and at least one communications bus 1004. The communications bus 1004 is configured to implement connections and communication between these components. The communications interface 1002 in the apparatus in this embodiment of the present disclosure is configured to perform signaling or data communication with another node device. The memory 1003 may be a high-speed random access memory (RAM), or may be a non-volatile memory such as at least one magnetic disk memory. Optionally, the memory 1003 may be at least one storage apparatus far from the processor 1001.

If the apparatus in FIG. 10 is a control device, the memory 1003 stores a group of program code, and the processor 1001 executes the program code stored in the memory 1003 to execute the method to be executed by the control device or implement functions to be implemented by the control device. If the apparatus in FIG. 10 is a source device, the memory 1003 stores a group of program code, and the processor 1001 executes the program stored in the memory 1003 to execute the method to be executed by the source device or implement functions to be implemented by the source device. If the apparatus in FIG. 10 is a parsing device, the memory 1003 stores a group of program code, and the processor 1001 executes the program stored in the memory 1003 to execute the method to be executed by the parsing device or implement functions to be implemented by the parsing device. If the apparatus in FIG. 10 is a destination device the memory 1003 stores a group of program code, and the processor 1001 executes the program stored in the memory 1003 to execute the method to be executed by the destination device or implement functions to be implemented by the destination device.

The source device in this embodiment of the present disclosure may be a host used by a user or a terminal required when a user accesses a network. The source device and the destination device in this embodiment of the present disclosure are relative. The destination device is a target device at which a first packet needs to arrive. The source device may be a device generating the first packet or a device initially sending the first packet.

It should be noted that, for ease of description, the foregoing method embodiments are described as a series of action combinations. However, a person skilled in the art should know that the present disclosure is not limited by the described action sequence. A person skilled in the art should also appreciate that all the embodiments described in the specification are embodiments, and the related actions and modules are not necessarily mandatory to the present disclosure. A person of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a RAM, a magnetic disk, and an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A parsing device, comprising:
a non-transitory computer-readable storage medium configured to store programming instructions; and
a processor coupled to the non-transitory computer-readable storage medium, wherein the programming instructions cause the processor to be configured to:
receive a second packet from a source device, wherein the parsing device is a trusted device selected on a path between the source device and a destination device, wherein the second packet comprises first name information, a first encryption result, a first ciphertext, and a first packet, wherein the first name information is a combination of a source name and a name of the parsing device, wherein the source name identifies the source device, and wherein the first encryption result is obtained after a first identity verification code is digitally signed using a private key of the source device;
obtain a third packet according to a device identifier of the parsing device and the second packet, wherein the third packet comprises the first packet, the first ciphertext, and verification information, and wherein the verification information is generated according to the device identifier of the parsing device and the first ciphertext;
send the third packet to the destination device;
decrypt the first encryption result using a public key of the source device to obtain the first identity verification code; and verify that the second packet is not tampered when the first identity verification code matches the first name information.

2. The parsing device of claim 1, wherein the programming instructions further cause the processor to be configured to:
  decrypt the first ciphertext using the device identifier of the parsing device to obtain second name information, wherein the second name information is a combination of the source name and a destination name, and wherein the destination name identifies the destination device;
  obtain the verification information according to the second name information, wherein the verification information comprises the second name information and a second encryption result, wherein the second encryption result is obtained after a second identity verification code is digitally signed using a private key of the parsing device, and wherein the second identity verification code corresponds to the second name information; and
  obtain the third packet according to the verification information, the first packet, and the first ciphertext.

3. The parsing device of claim 2, wherein the destination name comprises an Internet Protocol (IP) address of the destination device.

4. The parsing device of claim 2, wherein the destination name comprises a Media Access Control (MAC) address of the destination device.

5. The parsing device of claim 2, wherein the destination name comprises a name of the destination device.

6. The parsing device of claim 2, wherein the destination name comprises a uniform resource locator (URL) related to the destination device.

7. The parsing device of claim 1, wherein the source name comprises an Internet Protocol (IP) address of the source device.

8. The parsing device of claim 1, wherein the source name comprises a Media Access Control (MAC) address of the source device.

9. The parsing device of claim 1, wherein the source name comprises a name of the source device.

10. The parsing device of claim 1, wherein the source name comprises a uniform resource locator (URL) related to the source device.

11. A packet parsing method, comprising:
  receiving, by a parsing device, a second packet from a source device, wherein the parsing device is a trusted device selected on a path between the source device and a destination device, wherein the second packet comprises first name information, a first encryption result, a first ciphertext, and a first packet, wherein the first name information is a combination of a source name and a name of the parsing device, wherein the source name identifies the source device, and wherein the first encryption result is obtained after a first identify verification code is digitally signed using a private key of the source device;
  obtaining, by the parsing device, a third packet according to a device identifier of the parsing device and the second packet, wherein the third packet comprises the first packet, the first ciphertext, and verification information, and wherein the verification information is generated according to the device identifier of the parsing device and the first ciphertext;
  sending, by the parsing device, the third packet to the destination device;
  decrypting, by the parsing device, the first encryption result using a public key of the source device to obtain the first identity verification code; and
  verifying, by the parsing device, that the second packet is not tampered when the first identity verification code matches the first name information.

12. The packet parsing method of claim 11, wherein obtaining, by the parsing device, the third packet according to the device identifier of the parsing device and the second packet comprises:
  decrypting, by the parsing device, the first ciphertext using the device identifier of the parsing device to obtain second name information, wherein the second name information is a combination of the source name and a destination name, and wherein the destination name identifies the destination device;
  obtaining, by the parsing device, the verification information according to the second name information, wherein the verification information comprises the second name information and a second encryption result, wherein the second encryption result is obtained after a second identity verification code is digitally signed using a private key of the parsing device, and wherein the second identity verification code corresponds to the second name information; and
  obtaining, by the parsing device, the third packet according to the verification information, the first packet, and the first ciphertext.

13. The packet parsing method of claim 12, wherein the destination name comprises an Internet Protocol (IP) address of the destination device, a Media Access Control (MAC) address of the destination device, a name of the destination device, or a uniform resource locator (URL) related to the destination device.

14. The packet parsing method of claim 11, wherein the source name comprises an Internet Protocol (IP) address of the source device, a Media Access Control (MAC) address of the source device, a name of the source device, or a uniform resource locator (URL) related to the source device.

15. A computer program product comprising instructions for storage on a non-transitory computer-readable medium that, when executed by a processor, cause a parsing device to:
  receive a second packet from a source device, wherein the parsing device is a trusted device selected on a path between the source device and a destination device, wherein the second packet comprises first name information, a first encryption result, a first ciphertext, and a first packet, wherein the first name information is a combination of a source name and a name of the parsing device, wherein the source name identifies the source device, and wherein the first encryption result is obtained after a first identify verification code is digitally signed using a private key of the source device;
  obtain a third packet according to a device identifier of the parsing device and the second packet, wherein the third packet comprises the first packet, the first ciphertext, and verification information, and wherein the verification information is generated according to the device identifier of the parsing device and the first ciphertext;
  send the third packet to the destination device;
  decrypt the first encryption result using a public key of the source device to obtain the first identity verification code; and
  verify that the second packet is not tampered when the first identity verification code matches the first name information.

16. The computer program product of claim 15, wherein the instructions cause the parsing device to obtain the third packet according to the device identifier of the parsing device and the second packet comprises the instructions causing the parsing device to:
- decrypt the first ciphertext using the device identifier of the parsing device to obtain second name information, wherein the second name information is a combination of the source name and a destination name, and wherein the destination name identifies the destination device;
- obtain the verification information according to the second name information, wherein the verification information comprises the second name information and a second encryption result, wherein the second encryption result is obtained after a second identity verification code is digitally signed using a private key of the parsing device, and wherein the second identity verification code corresponds to the second name information; and
- obtain the third packet according to the verification information, the first packet, and the first ciphertext.

17. The computer program product of claim 16, wherein the source name comprises an Internet Protocol (IP) address of the source device.

18. The computer program product of claim 16, wherein the source name comprises a Media Access Control (MAC) address of the source device.

19. The computer program product of claim 16, wherein the destination name comprises an Internet Protocol (IP) address of the destination device, a Media Access Control (MAC) address of the destination device, a name of the destination device, or a uniform resource locator (URL) related to the destination device.

20. The computer program product of claim 15, wherein the source name comprises an Internet Protocol (IP) address of the source device, a Media Access Control (MAC) address of the source device, a name of the source device, or a uniform resource locator (URL) related to the source device.

* * * * *